United States Patent
Kurono et al.

(10) Patent No.: US 8,564,184 B2
(45) Date of Patent: Oct. 22, 2013

(54) SPARK PLUG AND PROCESS FOR PRODUCING SPARK PLUG

(75) Inventors: Hirokazu Kurono, Nagoya (JP); Toshitaka Honda, Nagoya (JP); Katsuya Takaoka, Ichinomiya (JP); Hiroki Takeuchi, Aichi (JP); Kuniharu Tanaka, Komaki (JP); Takeshi Mitsuoka, Konan (JP)

(73) Assignee: NGK Spark Plug Co., Ltd., Aichi (JP)

( * ) Notice: Subject to any disclaimer, the term of this patent is extended or adjusted under 35 U.S.C. 154(b) by 28 days.

(21) Appl. No.: 13/497,904

(22) PCT Filed: Jun. 23, 2010

(86) PCT No.: PCT/JP2010/004161
§ 371 (c)(1),
(2), (4) Date: Mar. 23, 2012

(87) PCT Pub. No.: WO2011/036832
PCT Pub. Date: Mar. 31, 2011

(65) Prior Publication Data
US 2012/0262049 A1    Oct. 18, 2012

(30) Foreign Application Priority Data
Sep. 25, 2009    (JP) ................. 2009-221066

(51) Int. Cl.
| H01T 13/20 | (2006.01) |
| H01T 13/36 | (2006.01) |
| H01T 13/38 | (2006.01) |
| H01T 21/00 | (2006.01) |

(52) U.S. Cl.
USPC ............... 313/143; 313/141; 313/144; 445/7

(58) Field of Classification Search
USPC ...................................... 313/141–145; 445/7
See application file for complete search history.

(56) References Cited

U.S. PATENT DOCUMENTS

| 5,831,377 A * | 11/1998 | Matsubara et al. ........... 313/141 |
| 2002/0041138 A1 | 4/2002 | Nishikawa .................... 313/143 |
| 2002/0140333 A1 | 10/2002 | Kato et al. .................... 313/143 |
| 2007/0126330 A1 | 6/2007 | Kuki et al. .................... 313/143 |
| 2007/0228915 A1 * | 10/2007 | Honda et al. .................. 313/143 |
| 2012/0038263 A1 * | 2/2012 | Katsuraya et al. ........... 313/144 |
| 2013/0015756 A1 * | 1/2013 | Yamada et al. ............... 313/143 |

FOREIGN PATENT DOCUMENTS

| CN | 101039016 A | 9/2007 |
| CN | 101479900 A | 7/2009 |
| EP | 1 220 396 A1 | 7/2002 |
| EP | 1 309 052 A2 | 5/2003 |

(Continued)

OTHER PUBLICATIONS

International Search Report for International Application No. PCT/JP2010/004161, Sep. 28, 2010.

(Continued)

*Primary Examiner* — Mariceli Santiago
(74) *Attorney, Agent, or Firm* — Kusner & Jaffe

(57) ABSTRACT

A spark plug that is equipped with an insulator that has a stem portion on a front end side, a center electrode, and a main metal member that retains the insulator at an engaging projection portion, wherein an inner diameter $D_{IN}$ of the engaging projection portion, the maximum outer diameter $d_{OUT}$ of the stem portion, which faces an inner circumferential surface of the engaging projection portion, its inner diameter $d_{IN}$, and dielectric constant $\in$ of the insulator satisfy the condition of "$(D_{IN}-d_{OUT})/2 \leq 0.40$ (mm)", "$(d_{OUT}-d_{IN})/2 \leq 1.65$ (mm)", and "$\in \geq 9.4$".

5 Claims, 3 Drawing Sheets

(56) References Cited

FOREIGN PATENT DOCUMENTS

| | | |
|---|---|---|
| EP | 1 708 326 A1 | 10/2006 |
| JP | 11-233234 | 8/1999 |
| JP | 2000-247729 | 9/2000 |
| JP | 2001-335360 | 12/2001 |
| JP | 2002-260817 | 9/2002 |
| JP | 2005-183177 | 7/2005 |
| JP | 2006-196474 | 7/2006 |
| JP | 2009-146636 | 7/2009 |

OTHER PUBLICATIONS

Office Action (dated Dec. 24, 2012) issued in connection with corresponding Chinese Patent Application No. 201080042325.6, with brief English summary.

* cited by examiner

SPARK PLUG AND PROCESS FOR PRODUCING SPARK PLUG

FIELD OF THE INVENTION

This invention relates to a spark plug and a process for producing the spark plug, and in detail relates to a small spark plug having both stain resistance and withstand voltage characteristics for a long time, even if it is small, and a process for producing this spark plug.

BACKGROUND OF THE INVENTION

As one of spark plugs used for ignition of internal combustion engines, such as an automobile gasoline engine, there is a type of spark plug in which an insulator having a stem portion of which diameter is reduced toward the front end side through a stepped portion is mounted on a main metal member by an engagement of the stepped portion with an engaging projection portion formed on an inner circumferential surface of the main metal member, and in which a clearance is formed between the inner circumferential surface of the engaging projection portion and an outer circumferential surface of the stem portion, which is opposed thereto. In such a spark plug, once the clearance is invaded by an unburned gas generated, for example, under low-temperature environment, etc., the outer circumferential surface of the stem portion in the clearance is stained. As a result, stain resistance of the spark plug is spoiled.

Thus, there is proposed a spark plug that can be designed to have a small size without spoiling stain resistance of the spark plug, by narrowing the clearance to have a predetermined distance or less, as opposed to a prior art common knowledge to make the clearance wider in view of stain resistance.

For example, in Patent Publication 1 (Japanese Patent Application Publication No. 2002-260817), there is described a spark plug characterized by that it is equipped with a cylindrical main metal member (1), an insulator (2) that is locked on an inner circumferential side of the main metal member (1) and has an axial hole, a center electrode (3) retained in the axial hole of the insulator (2), and an earth electrode that forms a spark discharge gap (g) by facing to an end of the center electrode (3), that, in an axial direction (O) of the insulator (2), a side on which the spark discharge gap (g) is positioned is defined as a front side, and a side opposite to this is defined as a rear side, that the insulator (2) has a front end portion (2i) of which diameter is reduced by a circumferential stepped portion that is defined as an insulator side engaging portion (2h), that the insulator is inserted into the main metal member (1) from a rear side opening portion, that the insulator side engaging portion (2h) is engaged with a metal member side engaging portion (1c) that projects from an inner circumferential surface of the main metal member (1), that an outer circumferential surface (hereinafter referred to as a clearance-forming outer circumferential surface) (2k) of the portion (2i), which is positioned on the front side of the insulator side engaging portion (2h) of the insulator (2), is opposed to an inner circumferential surface (hereinafter referred to as a clearance-forming inner circumferential surface) (52) of the metal member side engaging portion (1c) in a manner to form an engaging position clearance (Q) of a predetermined amount, and that, when an outer diameter of the clearance-forming outer circumferential surface (2k) is defined as d1 and when an inner diameter of the clearance-forming inner circumferential surface (52) is defined as D1, an amount β of the engaging position clearance, which is expressed by $\beta=(D1-d1)/2$, is adjusted to 0.4 mm or less.

Furthermore, in Patent Publication 2 (Japanese Patent Application Publication No. 2005-183177), there is described a spark plug characterized by that it is equipped with an insulator that is generally cylindrically formed and has a through hole in an axial direction, a rod-shaped center electrode that is inserted into a front end side of the through hole of the insulator, a generally cylindrical main metal member that retains it by inserting a front end side in an axial direction of the insulator, and an earth electrode that is joined at one end portion to a front end of the main metal member, faces to the center electrode at the other end portion opposite to the one end portion, and forms a spark discharge gap between the other end portion and the center electrode, that the insulator is made up of an insulator rear end portion formed on a rear end side of the insulator, an insulator front end portion that is formed on a front end side of the insulator and has a diameter reduced from an outer diameter of the insulator rear end portion, and a first insulator stepped portion for connecting together the insular rear end portion and the insulator front end portion, that the main metal member is made up of a main metal member rear end portion formed on a rear end side of the main metal member, a main metal member front end portion that is formed on a front end side of the main metal member and has, on at least a rear end side, a portion having an inner diameter reduced from an inner diameter of the main metal member rear end portion, and a first main metal member stepped portion for connecting together the main metal member rear end portion and the main metal member front end portion, that the first insulator stepped portion is engaged with the first main metal member stepped portion through a packing, that, when a section containing an axis is viewed, an outer diameter of the insulator front end portion is represented by d1 and an inner diameter of the main metal member front end portion is represented by D1, and that a length, which is parallel to the axial direction of the insulator, of a clearance satisfying "$(D1-d1)/2<0.45$ mm" is 1.2 mm or more and 5 mm or less, when the front end side of the insulator is defined as plus, as a position on the front end side in the axial direction of engagement positions between the packing and the main metal member stepped portion is defined as a starting point, By the way, in order to make a small-size spark plug, it is effective to make the insulator thin in thickness, besides making the clearance narrow. On the other hand, when the clearance is made narrow, there is a tendency in general that the voltage applied to the insulator, which forms the clearance, becomes high. Therefore, it becomes possible to have a small-size spark plug, while maintaining its stain resistance, by using an insulator thinned in thickness and by making the clearance narrow. Due to a high voltage applied to this insulator, however, insulation breakdown may occur. As a result, withstand voltage characteristics may lower. In particular, when a condition with a high voltage applied to the insulator continues for a long term, withstand voltage characteristics may lower significantly due to the occurrence of many insulation breakdowns on the insulator. For example, when a spark plug is made small such that nominal diameter of the mounting thread portion becomes M12 or less, the spark plug becomes difficult to have both stain resistance and withstand voltage characteristics.

SUMMARY OF THE INVENTION

Task to be Solved by the Invention

A task to be solved by this invention is to provide a spark plug that has both stain resistance and withstand voltage characteristics for a long term, even if it is small.

A task to be solved by this invention is to provide a spark plug production process capable of producing a spark plug that has both stain resistance and withstand voltage characteristics for a long term, even if it is small.

Means for Solving Task

This invention as a means for solving the task is a spark plug that is equipped with an insulator that is generally cylindrically formed to have a small-diameter stem portion on a front end side and has a through hole passing though in an axial direction, a center electrode inserted on the front end side of the through hole, and a main metal member that is generally cylindrically formed to have an engaging projection portion projecting inwardly in the diametral direction and retains the insulator inserted thereinto, at the engaging projection portion, characterized by that, when an inner diameter of the engaging projection portion is represented by $D_{IN}$ (mm), the maximum outer diameter of a portion, which faces an inner circumferential surface of the engaging projection portion, of the stem portion is represented by dour (mm), and its inner diameter is represented by $d_{IN}$ (mm), and dielectric constant of the insulator is represented by $\in$, condition (1) of "$(D_{IN}-d_{OUT})/2 \leq 0.40$ (mm)", condition (2) of "$(d_{OUT}-d_{IN})/2 \leq 1.65$ (mm)", and condition (3) of "$\in \geq 9.4$" are satisfied.

This invention as another means for solving the task is characterized by that it comprises a step for producing the insulator by conducting pressing and then sintering on a raw material powder containing Al compound powder as a main component, Si compound powder, a powder, of a compound of an element of group 2 in the periodic table based on IUPAC Recommendation 1990, of at least two kinds containing Mg compound powder and Ba compound powder, and 0.5-4.0 mass % of a rare-earth compound powder, such that the sum of the contents of these in terms of oxide becomes 100 mass %.

Advantageous Effect of the Invention

Since a spark plug according to this invention satisfies the conditions (1) to (3), it shows sufficient withstand voltage characteristics without spoiling stain resistance, even if a condition with a high voltage applied to a thinned insulator extends to a long term. Furthermore, a spark plug production process according to this invention produces the insulator by pressing the raw material powder to have predetermined dimensions and then sintering. Therefore, this insulator satisfies the conditions (1) to (3). Thus, according to this invention, it is possible to provide a small-size spark plug having both stain resistance and withstand voltage characteristics for a long term, even if it is small-sized, and a spark plug production process capable of producing such spark plug.

SUMMARY OF THE INVENTION

Figure 1:
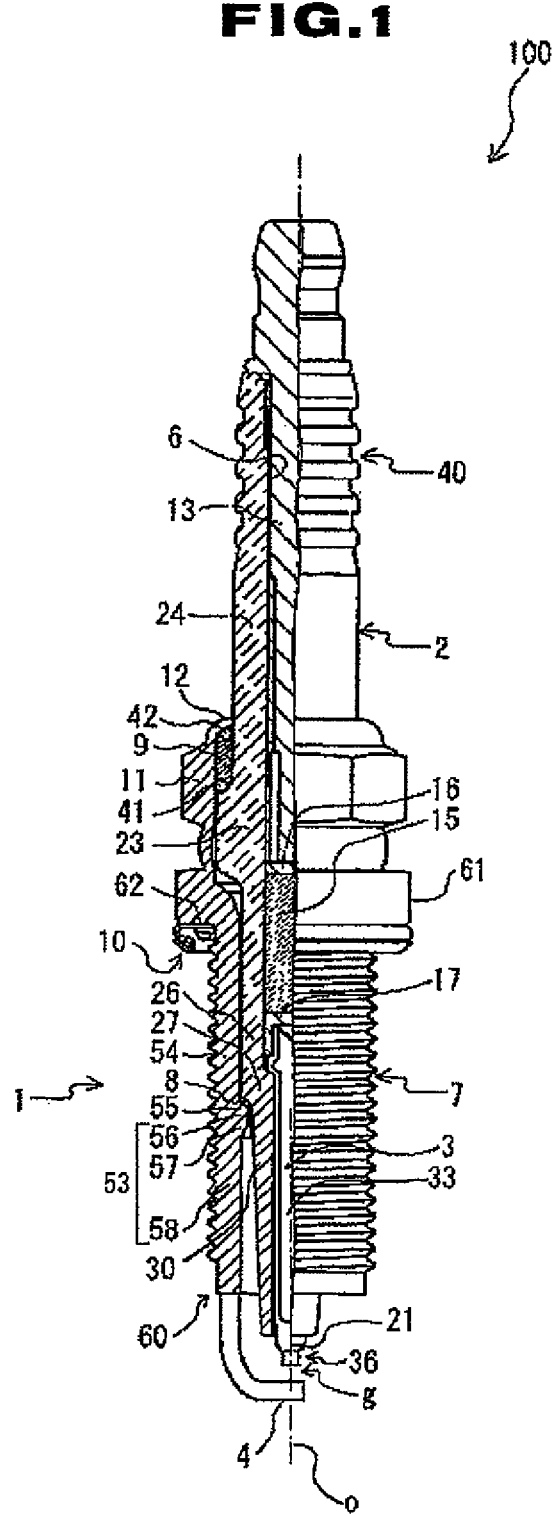
FIG. 1 is a longitudinal partially sectional view showing a spark plug according to one embodiment of this invention.

A spark plug according to this invention is equipped with an insulator that is generally cylindrically formed to have a small-diameter stem portion on a front end side and has a through hole passing though in an axial direction, a center electrode inserted on the front end side of the through hole, and a main metal member that is generally cylindrically formed to have an engaging projection portion projecting inwardly in the diametral direction and retains the insulator inserted thereinto, at the engaging projection portion. As long as the spark plug according to this invention is a spark plug having such constituents, other constituents are not particularly limited, and it may have publicly-known various constituents. For example, a spark plug according to this invention may be equipped with the insulator, the center electrode, the main metal member, and an earth electrode that has one end portion joined to the main metal member and the other end portion opposed to the center electrode to form a spark discharge clearance between the other end portion and the center electrode.

A spark plug according to one embodiment of this invention is explained with reference to FIG. 1 to FIG. 3. This spark plug 100 is used as an ignition spark plug of internal combustion engines such as automotive gasoline engines. In the following explanation, an axis (a dash-dotted line shown in FIG. 1 and FIG. 2) of the spark plug 100 constructed to be generally rod-shaped is referred to as "axis O". Furthermore, in FIG. 1 to FIG. 3, a lower side of the drawing, that is, a side for installing an earth electrode 4 is referred to as a front end side of the spark plug 100, and an upper side of the drawing, that is, a side for forming a corrugated portion 40 is referred to as a rear end side of the spark plug 100.

A basic structure of this spark plug 100 is explained. As shown in FIG. 1, this spark plug 100 is equipped with an insulator 2 that is generally cylindrically formed to have a small-diameter stem portion 30 on the front end side and has a through hole 6 passing through in the direction of the axis O, a center electrode 3 inserted on the front end side of this through hole 6, a main metal member 1 that is generally cylindrically formed to have on an inner circumferential surface an engaging projection portion 56 projecting inwardly in the diametral direction and retains the insulator 2 inserted thereinto, at the engaging projection portion 56, and an earth electrode 4 having one end portion joined to the main metal member 1 and the other end portion opposed to the center electrode 3 to have a spark discharge clearance g between the other end portion and the center electrode 3.

More specifically, as shown in FIG. 1, the spark plug 100 is equipped with a generally cylindrical main metal member 1 having on an inner circumferential surface an engaging projection portion 56 projecting inwardly in the cliametral direction to be ringlike, a generally cylindrical insulator 2 that is inserted into this main metal member 1 and is retained at the engaging projection portion 56 in a manner to project from the front end portion of the main metal member 1 in the direction of the axis O, a generally rod-shaped center electrode 3 inserted into the through hole 6 of the insulator 2 in a manner that an electrode front end portion 36 projects from the front end of the insulator 2, and an earth electrode 4 disposed such that one end is welded to the front end portion of the main metal member 1 in the direction of the axis O, that the other end side opposite to this one end side is bent sideward, and that its side surface is disposed to be opposed to the electrode front end portion 36 of the center electrode 3.

Figure 2:
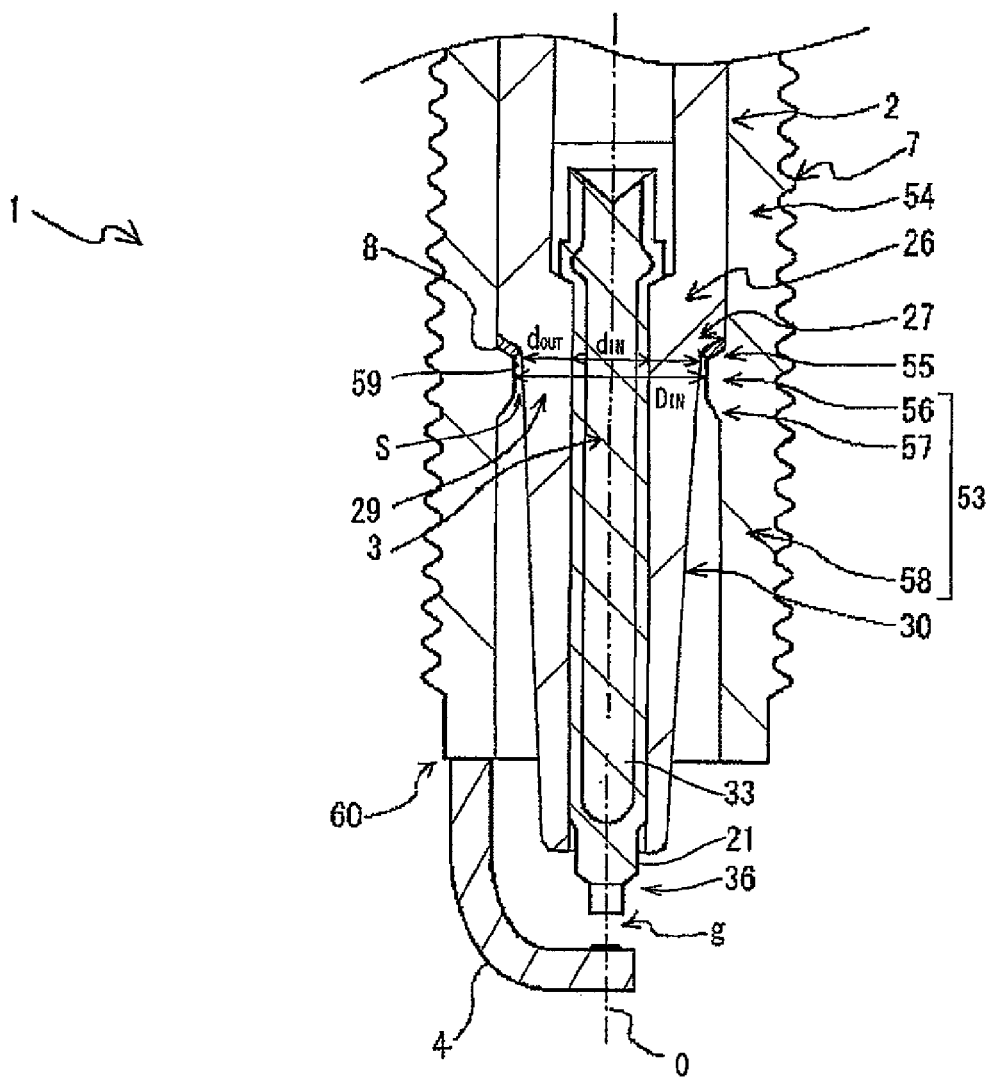
FIG. 2 is an enlarged, partial, longitudinal sectional view showing an enlargement of an essential portion on the front end side of a spark plug according to one embodiment of this invention.

In the spark plug 100, as shown in FIG. 1 and FIG. 2, the insulator 2, specifically at around a front end portion of the after-mentioned stem portion 30, projects from the front end surface of the main metal member 1 toward the earth electrode 4, and the center electrode 3 at its electrode front end portion 36 projects from the front end surface of the insulator 2 toward the earth electrode 4. As mentioned hereinafter, between the main metal member 1 and the stem portion 30 of the insulator 2, there is formed a base portion clearance S interposed between an inner circumferential surface of the main metal member 1 and an outer circumferential surface of the stem portion 30.

As shown in FIG. 1, the main metal member 1 is generally cylindrically formed by a metal, such as low-carbon steel, to have the engaging projection portion 56 on the inner circumferential surface, and is used as a housing of the spark plug 100. A mounting thread portion 7 for mounting on an engine head not shown in the drawings is formed on an outer circumferential surface on the front end side in the direction of the axis O in the main metal member 1. As one example of the standard of this mounting thread portion 7, it is possible to mention M10, M12, M14, etc. In this invention, nominal designation of the mounting thread portion 7 means the value defined in ISO 2705 (M12), ISO 2704 (M10), etc. Naturally, it allows a variation within a range of dimension tolerance defined in the standnrds. In this invention, a small-size spark plug means a spark plug in which nominal diameter of the mounting thread portion 7 is M12 or less. On the rear end side of the mounting thread portion 7 in the direction of the axis O, the main metal member 1 is formed with a tool engagement portion 11 with which a tool, such as a spanner or wrench, is engaged from the outside when mounting the main metal member 1 on the engine head. In the spark plug 100, the tool engagement portion 11 is hexagonal in a section perpendicular to the direction of the axis O. Furthermore, as shown in FIG. 1, the main metal member 1 is formed with a flange portion 61 that is formed to project outwardly in the outer diametral direction at a generally middle portion in the direction of the axis O, on the front end side of the tool engagement portion 11 in the direction of the axis O. Then, a gasket 10 is fitted at around the rear end side of the mounting thread portion 7, that is, on a seating surface 62 of the flange portion 61.

As shown in FIG. 1 and FIG. 2, the main metal member 1 is made up of a main metal member rear end portion 54 that is formed on the front end side of the flange portion 61 in the direction of the axis O to be on the side of the flange portion 61, a main metal member front end portion 53 that is formed on the front end side of the main metal member 1 and has, on at least a rear end side, a portion having an inner diameter reduced from an inner diameter of the main metal member rear end portion 54, and a first main metal member stepped portion 55 for connecting together the main metal member rear end portion 54 and the main metal member front end portion 53.

More specifically, as shown in FIG. 1 and FIG. 2, the main metal member 1 is formed to have a main metal member rear end portion 54 that is formed on the front end side of the tool engagement portion 11 of the main metal member 1, an engaging projection portion (also referred to as "main metal member base portion" in this invention) 56 that is formed on the front end side of this main metal member rear end portion 54 in the direction of the axis O to project inwardly in the inner diametral direction of the main metal member 1, a first main metal member stepped portion 55 for connecting together this main metal member base portion 56 and the main metal member rear end portion 54, a main metal member front portion 58 that is formed on the front end side of the main metal member base portion 56 in the direction of the axis O and has an inner diameter that is nearly the same as that of the main metal member rear end portion 54, and a second main metal member stepped portion 57 for connecting together this main metal member front portion 58 and the main metal member base portion 56. Therefore, the main metal member 1 is constructed to sequentially form the main metal member rear end portion 54, the first main metal member stepped portion 55, the main metal member base portion 56, the second main metal member stepped portion 57, and the main metal member front portion 58 in this order from the flange portion 61 toward the front end side in the direction of the axis O. In this invention, the main metal member front end portion 53 is formed of the main metal member front portion 58, the second main metal member stepped portion 57, and the main metal member base portion 56. The first main metal member stepped portion 55 is a main metal member side engaging portion for an engagement with a first insulator stepped portion 27 of the after-mentioned insulator 2.

Figure 3:
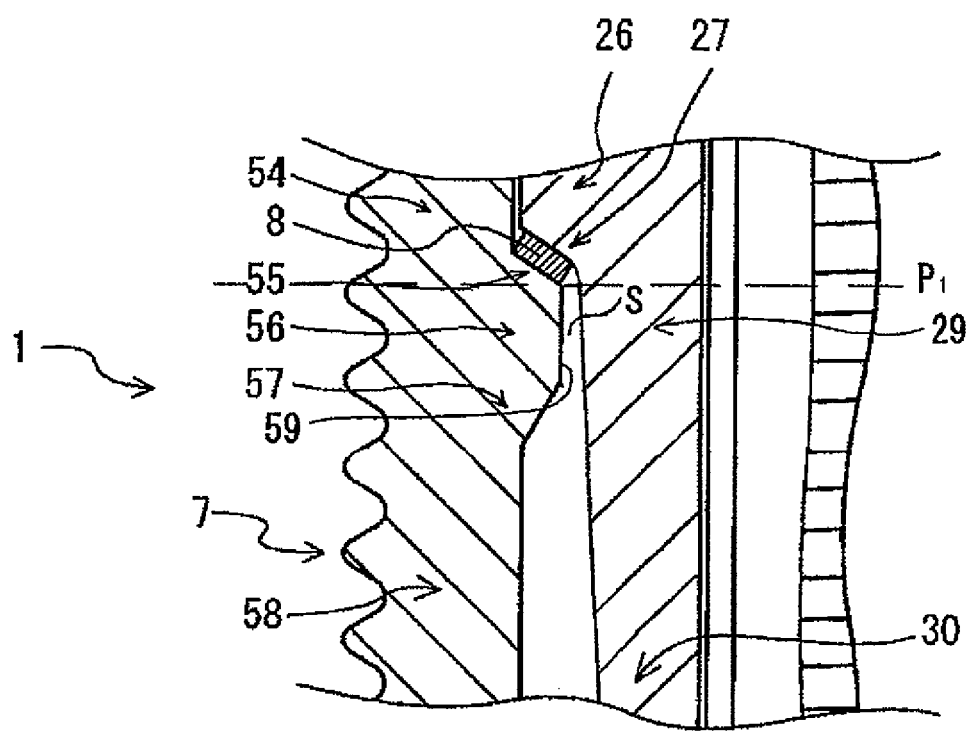
FIG. 3 is an enlarged, partial, longitudinal sectional view showing an enlargement of the vicinity of a clearance portion formed between a main metal member and an insulator in a spark plug according to one embodiment of this invention.

As shown in FIG. 1 to FIG. 3, the engaging projection portion 56 is a ring-like projection portion having an inner diameter, which is nearly constant in the direction of the axis O, and making a circle in a circumferential direction of an inner hole of the main metal member 1. This engaging projection portion 56 forms a trapezoidal section, together with the first main metal member stepped portion 55 and the second main metal member stepped portion 57. Therefore, an inner circumferential surface 59 of the engaging projection portion 56 extends along the axis O.

As shown in FIG. 1, the insulator 2 is a generally cylindrical body for retaining the center electrode 3 by an insertion thereinto. This insulator 2 has a through hole 6 that passes through along the direction of the axis O. A generally rod-shaped, terminal member 13 is mounted by insertion on a rear end portion of this through hole 6 in the direction of the axis O. A generally rod-shaped center electrode 3 is mounted by insertion on the other end side opposite to one end side of the through hole 6, on which terminal member 13 is mounted by insertion, that is, on the front end side of the through hole 6. As shown in FIG. 1, a resistor 15 is disposed between the terminal member 13 and the center electrode 3, which are mounted by insertion on the through hole 6. Conductive glass seal layers 16 and 17 are respectively disposed on both end portions, that is, a front end portion and a rear end portion, of this resistor 15 in the direction of the axis O. Then, the center electrode 3 and the terminal member 13 are electrically connected with each other through the conductive glass seal layers 16 and 17. In this manner, the resistor 15 and the conductive glass seal layers 16 and 17 constitute a sintered conductive material portion. The resistor 15 is made of a resistor composition prepared by using, as a raw material, a mixed powder of a glass powder, a conductive material powder and according to need a ceramic powder other than glass. Furthermore, a high voltage cable (not shown in FIG. 1) is connected to a rear end portion of the terminal member 13 in the direction of the axis O through a plug cap (not shown in FIG. 1) to apply a high voltage thereto.

In the insulator 2, as shown in FIG. 1, there is formed a flange-shaped, projection portion 23 projecting outwardly in the outer diametral direction from an outer circumferential surface of the insulator 2 at a generally middle portion of the insulator 2 in the direction of the axis O. In the insulator 2, as shown in FIG. 1, there is formed a corrugated portion 40, in which a section containing the axis of the insulator 2 has a wavy shape, on an outer circumferential surface on the rear end side of the projection portion 23 in the direction of the axis O. This corrugated portion 40 forms a wavy shape on an outer circumferential surface of the insulator 2 to enlarge the surface area of the outer circumferential surface of the insulator 2. Therefore, for example, even if leaked electricity flows along the outer circumferential surface of the insulator 2 to cause leakage (leakage phenomenon), it is exhausted during the flow on the outer circumferential surface of the insulator 2, and therefore an effect of preventing leakage can be obtained.

The insulator 2 is formed of an insulator rear end portion 26 that is on the front end side of the projection portion 23 in the direction of the axis O and extends from the projection portion 23 toward the front end side, a stem portion (also referred to as "an insulator front end portion" in this invention) 30 that is formed on the front end side of the insulator rear end portion 26 and has a diameter reduced from an outer diameter of this insulator rear end portion 26, and a first insulator stepped portion 27 for connecting together the insulator rear end portion 26 and the stem portion 30.

More specifically, as shown in FIG. 1 and FIG. 2, the insulator 2 is formed to have an insulator rear portion 24 that is formed on the rear end side of the projection portion 23 in the direction of the axis O of the insulator 2, an insulator rear end portion 26 that is formed on the front side of the projection portion 23, a stem portion 30 that is formed on the front end side of the insulator rear end portion 26 in the direction of the axis O, and a first insulator stepped portion 27 that connects together this stem portion 30 and the insulator rear end portion 26 and forms a circumferential stepped portion. The stem portion 30 has an outer diameter that is smaller than that of the insulator rear end portion 26 and is gradually reduced toward the front end side in the direction of the axis O. That is, this stem portion 30 is truncated cone in shape, as correctly shown in FIG. 1 and FIG. 2.

In the spark plug 100, the insulator 2 is inserted through an opening portion on the rear end side of the main metal member 1 in the direction of the axis O, and, as shown in FIG. 1, the first insulator stepped portion 27 of the insulator 2 is engaged with or locked onto the first main metal member stepped portion 55 of the main metal member 1. The first insulator stepped portion 27 is an insular side engaging portion for an engagement with the first main metal member stepped portion 55. As shown in FIG. 1 to FIG. 3, a generally ringlike, plate packing 8 is disposed between the first main metal member stepped portion 55 of the main metal member 1 and the first insulator stepped portion 27. In this way, the first insulator stepped portion 27 and the first main metal member stepped portion 55 are engaged with each other through the plate packing 8, thereby preventing the insulator 2 from being removed in the direction of the axis O. The plate packing 8 is made of a material high in thermal conductivity, such as copper. If the plate packing 8 is high in thermal conductivity, heat removal from the spark plug 100 becomes good, thereby improving heat resistance. Such material is preferably a material having a thermal conductivity of 200 W/m·K or higher, such as copper or aluminum. In particular, if nominal designation of the mounting thread portion 7 in the spark plug 100 is as small as M12 or less, a particularly high heat resistance effect is shown.

In the spark plug 100, a generally ringlike packing 41, which engages with a rear side periphery of the projection portion 23, is disposed between an opening portion inner surface on the rear end side of the main metal member 1 in the direction of the axis O and an outer circumferential surface of the insulator 2. Furthermore, a generally ring-like packing 42 is disposed on the rear side of the packing 41 with an interposal of a filler layer 9, such as talc. Then, a swaged portion 12 is formed to hold the main metal member 1 onto the insulator 2 by pressing the main metal member 1 toward the front end side in the direction of the axis O and, under this condition, swaging an opening peripheral portion of the main metal member 1 toward the packing 42.

The center electrode 3 is fixed in an axial hole of the insulator 2 under a condition that a front end portion of the center electrode 3 projects from a front end surface of the insulator 2, and it is held under insulation against the main metal member 1. The center electrode 3 has at least at a surface layer portion an electrode parent material 21 made of a Ni (nickel) series alloy, such as Inconel (trade name) 600 or 601. In its interior, there is embedded a core member 33 containing a main component, such as Cu (copper) or Cu alloy, for accelerating heat radiation. That is, this center electrode 3 is formed of an outer member as a main body, and a core member 33 formed to be concentrically embedded in an axial portion in an interior of this outer member. The spark plug 100 equipped with the center electrode 3, in which the core member 33 is deeply embedded in the interior as just described, is strongly against "heating" too and is preferably used as a wide range type plug having a wide range of use temperature.

As shown in FIG. 1, the earth electrode 4 is made of a metal high in corrosion resistance. As one example, Ni alloy, such as Inconel (trademark) 600 or 601, is used. This earth electrode 4 has a generally rectangular, transverse section that is orthogonal to a longitudinal direction of the earth electrode itself and has a bent, square-bar-shaped external appearance. As shown in FIG. 1, a square-rod-shaped one end portion is joined by welding or the like to a joined portion 60 of one end portion on the front end side of the main metal member 1 in the direction of the axis O. On the other hand, the other end portion (also referred to as a front end portion), which is opposite to the one end portion of this earth electrode 4, is bent sideward to be opposed to the electrode front end portion 36 of the center electrode 3 in the direction of the axis O of the center electrode 3. As shown in FIG. 1 and FIG. 2, there is formed a spark discharge gap g between opposing surfaces of the electrode front end portion 36 of the center electrode 3 and the earth electrode 4. In general, this spark discharge gap g is set at 0.3 to 1.5 mm.

The thus structured spark plug 100 is characterized by, of the stem portion 30 in the insulator 2, a portion (hereinafter may be referred to as a stem base portion) 29, which is opposed to the inner circumferential surface 59 of the engaging projection portion 56, and a base portion clearance S between the engaging projection portion 56 and the stem base portion 29. The base portion clearance S is formed, in the direction of the axis O, on the front end side of the plate packing 8, which is disposed between the first insulator stepped portion 27 and the first main metal member stepped portion 55. In the spark plug 100, specifically, as sufficiently shown in FIG. 2 and FIG. 3, when an inner diameter of the engaging projection portion 56 is represented by $D_{IN}$ (mm), the maximum outer diameter of the stem base portion 29 is represented by $d_{OUT}$ (mm), and its inner diameter is represented by $d_{IN}$ (mm), the stem base portion 29 and the base portion clearance S satisfy condition (1) of "$(D_{IN}-d_{OUT})/2 \leq 0.40$ (mm)" and condition (2) of "$(d_{OUT}-d_{IN})/2 \leq 1.65$ (mm)".

In other words, the condition (1) means that the minimum width of the base portion clearance S in the radial direction, that is, the minimum distance between the inner circumferential surface 59 of the engaging projection portion 56 and the outer circumferential surface of the stem base portion 29 is 0.4 (mm) or less. If the condition (1) is satisfied, the spark plug 100 is improved in stain resistance and heat resistance, and downsizing of the spark plug becomes possible, too. Specifically, even if the spark plug 100 is left under an environment of usage, which tends to have stains, for example, at the moment of pre-delivery, it is possible to effectively block intrusion of unburned gas into the base portion clearance S. As a result, it is possible to prevent a stain of the outer circumferential surface of the stem base portion 29, which is generated by adhesion of carbon or the like. Furthermore, the stem base portion 29 and the engaging projection portion 56 are adjacent to each other with the minimum distance. With this, heat of the heated insulator 2 is easily transmitted from the stem base portion 29 to the engaging projection portion 56 through the base portion clearance S. Therefore, heat removal from the spark plug 100 is efficiently conducted, thereby improving heat resistance of the spark plug 100. In addition, the base portion clearance S is narrowed to satisfy the condition (1). With this, downsizing of the spark plug 100 is also possible.

The above-mentioned "$(D_{IN}-d_{OUT})/2$" is preferably 0.05 to 0.35 (mm), particularly preferably 0.20 to 0.30 (mm), in view of that downsizing is possible without spoiling superior stain resistance and heat resistance.

Herein, as shown in FIG. 1 to FIG. 3, since the stem portion 30 is generally truncated cone in shape, the outer diameter in the stem base portion 29 is not constant in the direction of the axis O. Thus, in this invention, the maximum outer diameter $d_{OUT}$ is taken as the outer diameter of the stem base portion 29 in the condition (1). In this invention, a portion of the stem portion 30 that is opposed to the engaging projection portion 56 does not contain the first insulator stepped portion 27 having the plate packing 8 interposed therebetween. Therefore, in the spark plug 100, as shown in FIG. 2 and FIG. 3, the maximum outer diameter dour of the stem base portion 29 is the outer diameter of a portion that is opposed to the rear end periphery in the inner circumferential surface 59 of the engaging projection portion 56, which is in the vicinity of the connecting portion between the first insulator stepped portion 27 and the stem base portion 29. In other words, the maximum outer diameter dour means the outer diameter of a sectional contour line of the stem base portion 29 in a hypothetical plane $P_1$ (see FIG. 3) that contains a rear end periphery in the inner circumferential surface 59 of the engaging projection portion 56 and is perpendicular to the axis O.

The length of the stem base portion 29 in the direction of the axis O, that is, the length of the inner circumferential surface 59 in the engaging projection portion 56 in the direction of the axis O is not particularly limited and is adjusted to, for example, 1.2 to 5.0 mm, preferably 1.5 to 3.0 mm. If the length is adjusted to be within the above range, it is possible to have both stain resistance and heat resistance at even higher levels.

In other words, the condition (2) means that the maximum thickness of the stem base portion 29 is 1.65 mm or less. If the condition (2) is satisfied, the spark plug 100 can sufficiently be downsized. It is preferable that the above-mentioned "$(d_{OUT}-d_{IN})/2$" is 1.0 mm or greater in order to maintain strength of the stem base portion 29. As shown in FIG. 3, the maximum thickness of the stem base portion 29 is the difference between the outer diameter and the inner diameter of the sectional contour lines of the stem base portion 29 in the hypothetical plane $P_1$ (see FIG. 3).

The spark plug 100 satisfies the following condition (3) provided that dielectric constant of the insulator 2 is represented by $\in$. In particular, in this invention, it is preferable that, of the insulator 2, particularly the stem portion 30 and the stem base portion 29 satisfy the following condition (3). Condition (3): $\in \geq 9.4$.

In this manner, when the insulator 2, the stem portion 30, and stem base portion 29 (hereinafter these may be referred to as the insulator 2 or the like.) have a dielectric constant $\in$ of the above range, even if the voltage applied to the insulator 2 or the like becomes high by narrowing the base portion clearance S as mentioned above, and even if the insulator 2 or the like is thinned as mentioned above, it shows sufficient withstand voltage characteristics without having insulation breakdown of the insulator 2 or the like. Furthermore, when the insulator 2 or the like has a dielectric constant $\in$ of the above range, even if a condition that a high voltage is applied to the insulator 2 or the like continues for a long term, insulation breakdown of the insulator 2 or the like does not occur easily, and the spark plug 100 shows sufficient withstand voltage characteristics without spoiling high stain resistance. Dielectric constant $\in$ of the insulator 2 is preferably 10.5 or less. If the dielectric constant $\in$ is 10.5 or less, electric field is hardly concentrated on pores scattered in the interior of the insulator 2, thereby effectively suppressing internal breakdown of the insulator 2 starting from the pores. Therefore, when dielectric constant $\in$ of the insulator 2 is within a range of 9.4 to 10.5, it is possible to even further effectively suppress the occurrence of insulation breakdown. Dielectric constant $\in$ can be measured in accordance with JIS R1641.

In this way, the spark plug 100, which satisfies any of the conditions (1) to (3), can be downsized and shows sufficient withstand voltage characteristics without spoiling high stain resistance, even if a condition that a high voltage is applied to the insulator 2 or the like thinned by the downsizing continues for a long term.

In this invention, it is preferable in the insulator 2 of the spark plug 100 that, when a plurality of spots, for example, nine spots, each having a region of 250 μm×190 μm on the mirror polished surface have been observed with a magnification power of 500, the areal ratio ($S_A/S$) of the total area $S_A$ of pores existing in the observed region to the area S of the observed region is 2.0 to 4.0%. In particular, it is preferable that the stem portion 30 or the stem base portion 29 has the areal ratio ($S_A/S$) of 2.0 to 4.0%. If the areal ratio ($S_A/S$) becomes small, electric field does not easily concentrate on pores scattered in the interior of the insulator 2, thereby suppressing internal breakdown of the insulator 2 starting from the pores. If it is too small, electric field tends to rather concentrate on the pores. This tends to generate internal breakdown of the insulator 2. Thus, in this invention, the areal ratio ($S_A/S$) is set at 2.0% or greater to avoid the concentration of electric field on the scattered pores. Therefore, in this invention, if the insulator 2 has the areal ratio ($S_A/S$) of 2.0 to 4.0%, electric field is hardly concentrated on pores, which may become starting points of insulation breakdown, and insulation breakdown hardly occurs on the insulator 2 or the like even if dielectric constant $\in$ of the insulator 2 or the like is increased for the purpose of improving withstand voltage characteristics.

The areal ratio ($S_A/S$) is calculated as follows. Firstly, a surface, that is, a mirror polished surface is prepared by polishing the insulator 2 or the like to have a mirror condition. The mirror polished surface is prepared by processing an arbitrary surface or arbitrary section of the insulator 2 or the like into a flat surface by using a 45 μm diamond grinder and by conducting a mirror polishing process until the surface roughness Ra becomes around 0.01 μm by sequentially using diamond pastes of 9 μm, 3 μm and 0.25 μm. Then, a carbon deposition is conducted on the thus prepared, mirror polished surface for providing conductivity. Using an electron microscope, a plurality of spots, for example, nine spots, each having a region of 250 μm×190 μm on the mirror polished surface are observed with a magnification power of 500, and each observed region is photographed. Each SEM reflection electron image photograph taken is subjected to a binarization with an image analyzing software (Soft Imaging System "Five" made by Olympus Corporation), thereby recognizing void portions corresponding to the pores. In each SEM reflection electron image photograph, there are determined the total area $S_A$ of the void portions and the areal ratio by dividing this total area $S_A$ by the area S of the observed region. The thus determined areal ratios are arithmetically averaged to calculate the areal ratio ($S_A/S$) of the insulator 2 or the like.

In this invention, when a plurality of spots, for example, nine spots each having a region of 250 μm×190 μm on the mirror polished surface are observed with a magnification power of 500, it is preferable in the insulator 2 of the spark plug 100 that the areal ratio ($S_{20}/S$) of the total area $S_{20}$ of pores, which exist in the observed region and of which diameter defined as that of a circle corresponding thereto is 20 μm or greater, to the area S of the observed region is 0.3% or less. In particular, it is preferable that the stem portion 30 or the stem base portion 29 has the areal ratio ($S_{20}/S$) of 0.3% or less. In case that the insulator 2 or the like has the areal ratio ($S_{20}/S$) of 0.3% or less, relatively large pores, of which diameters defined as those of circles corresponding thereto are 20 μm or greater, almost do not exist. Therefore, the insulator 2 or the like thinned by downsizing of the spark plug 100 is compact, and it is possible to maintain the original withstand voltage characteristics. In each SEM reflection electron image photograph taken similar to that for the areal ratio ($S_A/S$), there are determined the total area $S_{20}$ of void portions, of which diameter converted to that of a circle corresponding thereto exceeds 20 μm, and the areal ratio ($S_{20}/S$) by dividing this total area $S_{20}$ by the area S of the observed region. The thus determined areal ratios are arithmetically averaged to calculate the areal ratio ($S_{20}/S$) of the insulator 2 or the like.

In this invention, when the insulator 2 or the like of the spark plug 100 has a dielectric constants of 9.4 to 10.5, and when the areal ratio ($S_A/S$) is 2.0 to 4.0% and when the areal ratio ($S_{20}/S$) is 0.3% or less, a synergistic effect is obtained by the combination of the dielectric constant ∈, the areal ratio ($S_A/S$) and the areal ratio ($S_{20}/S$). That is, as mentioned above, electric field is not excessively concentrated on the pores. Furthermore, in the first place, there are few pores that become a starting point of insulation breakdown, and thereby the spark plug 100 is capable of showing superior withstand voltage characteristics.

To adjust the dielectric constant ∈, the areal ratio ($S_A/S$) and the areal ratio ($S_{20}/S$) within the above ranges in the insulator 2 of the spark plug 100, it suffices to form the insulator 2 by an alumina-based sintered body having the dielectric constant ∈, the areal ratio ($S_A/S$) and the areal ratio ($S_{20}/S$) of the above ranges.

In the spark plug 100, the insulator 2 containing the stem portion 30 is formed of an alumina-based sintered body. As its preferable example is mentioned, this alumina-based sintered body contains Al component as a main component, Si component, a component, of an element of group 2 in the periodic table based on IUPAC Recommendation 1990, of at least two kinds containing Mg component and Sa component, and 0.5-4.0 mass % of a rare-earth element component, such that the sum of the contents (hereinafter may be referred to as the total content) of these becomes 100 mass %. If the insulator 2 or the like is formed of such alumina-based sintered body, it is capable of showing withstand voltage characteristics without spoiling stain resistance, even if it is thinned in thickness in order to seek downsizing of the spark plug 100.

In particular, if the alumina-based sintered body has a dielectric constant ∈ of 9.4 to 10.5, if upon observing the mirror polished surface, the areal ratio ($S_A/S$) of the total area $S_A$ of the pores existing in the observed region to the area S of the observed region is 2.0 to 4.0%, and if the areal ratio ($S_{20}/S$) of the total area $S_{20}$ of pores, which exist in the observed region and of which diameter defined as that of a circle corresponding thereto is 20 μm or greater, is 0.3% or less, withstand voltage characteristics of the spark plug 100 equipped with the insulator 2 or the like formed of this alumina-based sintered body are even further improved.

The above-mentioned Al component is generally alumina ($Al_2O_3$) and exists as a main component in the alumina-based sintered body. In this invention, "a main component" refers to a component of which content is the highest. If Al component is contained as a main component, the sintered body becomes superior in withstand voltage characteristics, heat resistance, mechanical characteristics, etc. The content of Al component in the alumina-based sintered body is preferably 92.0 mass % to 97.0 mass %, particularly preferably 92.5 mass % to 96.5 mass %, provided that the total content is 100 mass %. If the content of Al component is within the above range, it becomes a compact, alumina-based sintered body. As a result, at the grain boundary of the alumina-based sintered body, the formation of a low-melting-point glass phase and persistence of pores are limited. Therefore, an insulator formed of this alumina-based sintered body shows high withstand voltage characteristics. In this invention, the content of Al component is expressed in mass % in terms of alumina ($Al_2O_3$), which is an oxide of Al component.

The above-mentioned Si component is a component derived from a sintering aid and exists in the alumina-based sintered body in the form of oxide, ion, etc. The Si component is melted upon sintering and normally generates a liquid phase. Therefore, it works as a sintering aid for accelerating densification of the sintered body. Furthermore, after sintering, Si component often forms a low-melting-point glass, etc. at the grain boundary phase of alumina crystal grains. However, if the alumina-based sintered body contains the aftermentioned other specific components in addition to Si component, it tends to preferentially form a high-melting-point glass phase, etc. other than the low-melting-point glass, in collaboration with the other components. Thus, the alumina-based sintered body hardly melts at low temperatures, thereby hardly generating migration, etc. which can be a cause of insulation breakdown. It is preferable that the content of Si component is 1.0 to 4.0 mass %, provided that the total content is 100 mass %. In this invention, the content of Si component is expressed in mass % in terms of $SiO_2$, which is an oxide of Si component.

The above-mentioned group 2 element component is a component derived from the sintering aid. In this invention, Mg component and Ba component are essential components. This group 2 element component will do by containing Mg component and Ba component. In addition to Mg component and Ba component, it is preferable to contain at least one, group 2 element component other than Mg component and Ba component. Herein, as the group 2 element component other than Mg component and Ba component, it is possible mention Ca component and Sr component from the viewpoint of low toxicity, etc. Specifically, as preferable group 2 element components, it is possible to mention three kinds of Mg component, Ba component and Ca component, three kinds of Mg component, Ba component and Sr component, and four kinds of Mg component, Ba component, Ca component and Sr component. In this invention, particularly preferable group 2 element components are the above-mentioned three kinds.

The above-mentioned Mg component is a component derived from the sintering aid, exists in the alumina-based sintered body in the form of oxide, ion, etc., and works as a sintering aid similar to Si component prior to sintering. The above-mentioned Ba component, the above-mentioned Ca component and the above-mentioned Sr component are components derived from sintering aid, exist in the alumina-based sintered body in the form of oxide, ion, etc., work as sintering aids similar to Mg component prior to sintering, and have a function of improving high-temperature strength of the alumina-based sintered body to be obtained. Therefore, if the group 2 element component is contained in the alumina-based sintered body, its withstand voltage characteristics and high-temperature strength are improved, and the sintering temperature upon sintering lowers.

The content of the group 2 element component is preferably 0.1 to 2.5 mass %, particularly preferably 0.5 to 2.9 mass %, provided that the total content is 100 mass %, in view of that it becomes compact to result in an alumina-based sintered body superior in withstand voltage characteristics and high-temperature strength when formed into an insulator, even if a raw material powder having a relatively large particle size has been used.

Regarding each content of Mg component, Ba component, Ca component and Sr component, it suffices that the total of these is within the above range. In case that these components are contained in the alumina-based sintered body, provided that, for example, the total content is 100 mass %, the content M of Mg component is preferably 0.01 to 0.40 mass %, the content B of Ba component is preferably 0.1 to 1.6 mass %, particularly preferably 0.18 to 1.6 mass %, the content C of Ca component is preferably 0.2 to 0.9 mass %, and the content S of Sr component is preferably 0.2 to 0.9 mass %. In this invention, in case that the alumina-based sintered body does not contain one of Ca component and Sr component, naturally the content C or content S becomes 0 mass %. In this invention, each content of the group 2 element components is expressed in mass in terms of its oxide, for example, MgO, BaO, CaO or SrO. The content of the group 2 element components refers to the total content of each content of the group 2 element component.

The above-mentioned rare-earth element component (referred to as RE component, too) is a component containing Sc, Y and a lanthanoid element. Specifically, they are Sc component, Y component, La component, Ce component, Pr component, Nd component, Pm component, Sm component, Eu component, Gd component, Tb component, Dy component, Ho component, Er component, Tm component, Yb component, and Lu component. RE component exists in the alumina-based sintered body in the form of oxide, ion, etc. Due to containment upon sintering, this RE component is capable of suppressing an excessive grain growth of alumina upon sintering and increasing melting point of the grain boundary glass phase by forming RE-Si series glass (rare-earth glass) at the grain boundary in collaboration with Si component. With this, it is capable of improving withstand voltage characteristics and high-temperature strength of the alumina-based sintered body.

As RE component, each component of the above will do. La component, Nd component, Pr component, Y component, etc. are preferable. La component, Nd component, Pr component and Y component, in which each element of La, Nd, Pr and Y contained in those has a large radius, are considered to form a high-melting-point crystalline phase in cooperation with Si component and to easily form hexaaluminate crystals having a high melting point of about 2000° C. in collaboration with Al component. These hexaaluminate crystals have β-alumina structure and have as a compositional formula a composition represented by RE(2A)x(Al)yOz (the above-mentioned x, y and z are respectively defined as x=0-2.5, y=11-16, and z=18-28. "2A" represents a group 2 element in the periodic table based on IUPAC Recommendation 1990.). For example, it is a crystalline phase represented by a chemical formula of $REAl_{11}O_{18}$, etc. Therefore, if the alumina-based sintered body contains as RE component at least one component selected from the group consisting of La component, Nd component, Pr component and Y component, a high-melting-point hexaaluminate crystals are formed. With this, the insulator 2 formed of the alumina-based sintered body shows withstand voltage characteristics and high-temperature strength. It suffices that the hexaaluminate crystals exist in the alumina-based sintered body. Although their existence spots are not particularly limited, it is preferable that they exist into the interior of the alumina-based sintered body. It is particularly preferable that they exist at the grain boundary between two grains and/or triple point of alumina crystalline grains.

The existence of the hexaaluminate crystals can be identified by X-ray diffraction, for example, by using JCPDS cards. Since no JCPDS cards exist with respect to Pr component and Nd component, identification by X-ray diffraction is impossible directly. Ionic radii of $Pr^{3+}$ and $Nd^{3+}$ are, however, almost equivalent to ionic radius of $La^{3+}$. Therefore, hexaaluminate crystals containing Pr component and Nd component show an X-ray diffraction spectrum analogous to JCPDS card (No. 33-699) of hexaaluminate crystals containing La component. Therefore, it is possible to verify the existence of hexaaluminate crystals containing Pr component and Nd component by a comparison with JCPDS card of hexaaluminate crystals containing La component. If the hexaaluminate crystals are formed by deposition in the burning process, anisotropic growth of the grains upon burning hardly occurs. Therefore, it is preferable.

As the content of RE component becomes high, there is a tendency that dielectric constant ∈ of the alumina-based sintered body becomes high. On the other hand, it may not become a compact alumina-based sintered body without making the sintering temperature high. Therefore, the content of RE component of the alumina-based sintered body is suitably adjusted in view of the formation of hexaaluminate crystals, dielectric constant ∈ of the alumina-based sintered body, and its sinterability. For example, it is preferable that the content of RE component is 0.5 to 4.0 mass %, provided that the above-mentioned total content is 100 mass %. In this invention, the content of RE component in the alumina-based sintered body is expressed in mass % in terms of oxide of each component. Specifically, in case that RE components are La component, Nd component and Y component, they are expressed in mass % in terms of oxide, "$RE_2O_3$". In the case of being Pr component, it is expressed in mass % in terms of oxide, "$Pr_6O_{11}$". When the alumina-based sintered body contains a plurality of RE components, the content of RE components is the total of the content of every RE component.

In this invention, it is possible to measure each content of Al component, Si component, the group 2 element component, and RE component in mass % in terms of oxide by quantitative analysis, fluorescence X-ray analysis or chemical analysis using, for example, electron probe micro analyzer (EPMA) or energy dispersive micro analyzer (EPMA/EDS). In this invention, the results calculated by conducting the above-mentioned quantitative analysis, fluorescence X-ray analysis, or chemical analysis on the alumina-based sintered body almost agree with the mixing ratio of the raw material powder used for producing the alumina-based sintered body.

Therefore, as a quantitative analysis is conducted using, for example, an electron probe micro analyzer, the alumina-based sintered body contains $Al_2O_3$ as a main component, $SiO_2$, oxides, of the group 2 elements in the periodic table based on IUPAC Recommendation 1990, of at least two kinds, including MgO and BaO, and 0.5 to 4.0 mass % of a rare-earth element oxide such that the total of these contents becomes 100 mass %.

The alumina-based sintered body consists essentially of Al component, Si component, the group 2 element component, and RE component. Herein, "essentially" means not allowing a component other than the above-mentioned components to be contained positively by addition, etc. Therefore, the alumina-based sintered body may contain inevitable impurities to the extent of not spoiling an object of this invention. As such inevitable impurities, it is possible to mention, for example, Na, S, N, etc. It is preferable that the content of these inevitable impurities is smaller. For example, it is preferably 0.1 parts by mass or less, provided that the total mass of Al component, Si component, the group 2 element component, and RE component. Furthermore, besides the inevitable impurities, the alumina-based sintered body may contain small amounts of other components, for example, B component, Ti component, Mn component, Ni component, etc., in addition to the above-mentioned Al component, Si component, the group 2 element component, and RE component.

In the spark plug 100, the insulator 2 is formed of the alumina-based sintered body. The insulator 2 and the alumina-based sintered body have the above-mentioned composition and the above-mentioned characteristics of the same. Therefore, according to this invention, it is possible to provide a spark plug that is equipped with both stain resistance and withstand voltage characteristics for a long term, even if it is small-sized. Furthermore, according to this invention, it is possible to provide a small-sized spark plug that is equipped with both stain resistance and withstand voltage characteristics for a long term, even if mounted on a high-power internal combustion engine, etc.

A spark plug production process according to this invention comprises a step of producing an insulator by pressing and then sintering a raw material powder containing Al compound powder as a main component, Si compound powder, a powder, of a compound of an element of group 2 (hereinafter may be referred to as group 2 element compound powder) in the periodic table based on IUPAC Recommendation 1990, of at least two kinds, containing Mg compound powder and Ba compound powder, and 0.5-4.0 mass % of a rare-earth compound powder, such that the sum of the contents of these in terms of oxide becomes 100 mass %. In the following, a spark plug production process according to this invention is specifically explained.

In a spark plug production process according to this invention, firstly, a raw material powder, that is, Al compound powder, Si compound powder, at least two kinds of group 2 element compound powders containing Mg compound powder and Ba compound powder, and a rare-earth compound powder are mixed together in a slurry. In some cases, every powder of the same material as the Al component, the same material as the Si component, the same material as the group 2 element component, and the same material as the RE component (these powers can also be referred to as the raw material powders.) is mixed in a slurry. Herein, it is possible to set the mixing percentage of each powder, for example, to be the same as the content of each component. It is preferable to conduct this mixing for eight hours or longer to make the mixing condition of the raw material powder homogeneous and to make the sintered body obtained highly compact.

Al compound power is not particularly limited so long as it is a compound that is converted to Al component by sintering. Generally, alumina ($Al_2O_3$) powder is used. Al compound powder may contain inevitable impurities in reality, such as Na, etc. Therefore, it is preferable to use one having a high purity. For example, it is preferable that purity of Al compound powder is 99.5% or higher. As Al compound powder, it is preferable in general to use a powder having an average particle size of 0.1-5.0 µm to obtain a compact alumina-based sintered body. Herein, the average particle size refers to the value measured by laser diffractometry by Microtrac particle size distribution measurement device (MT-3000) made by NIKKISO CO., LTD.

Si compound powder is not particularly limited so long as it is a compound that is converted to Si component by sintering. For example, it is possible to mention various inorganic powders such as oxides (including complex oxides), hydroxides, carbonates, chlorides, sulfates, nitrates, phosphates, etc. of Si. Specifically, it is possible to mention $SiO_2$ powder, etc. In the case of using a powder other than oxides as Si compound powder, its usage is grasped in mass % in terms of oxide. Purity of Si compound powder is basically the same as that of Al compound powder. It is preferable that Si compound powder has an average particle size D50 of 0.5-3.0 µm. If Si compound powder has an average particle size D50 in the above range, it is possible to make the grinding time of Si compound powder relatively short. This is superior in productivity. In particular, it is possible to suppress the generation of pores, of which diameter defined as that of a circle corresponding thereto is 20 µm or greater. Specifically, as the average particle size D50 is made large, pores of which diameter defined as that of a circle corresponding thereto is 20 µm or greater tend to be generated. With this, the above-mentioned areal ratio ($S_{20}/S$) tends to become large. The above-mentioned average particle size D50 is defined as a particle size of an integrated value of 50% in the particle size distribution and refers to the value measured by laser diffractometry by Microtrac particle size distribution measurement device (MT-3000) made by NIKKISO CO., LTD.

The above-mentioned group 2 element compound powder is not particularly limited so long as it is a compound that is converted to at least two, group 2 element components containing Mg component and Ba component. For example, it is possible to mention various inorganic powders such as oxides (including complex oxides), hydroxides, carbonates, chlorides, sulfates, nitrates, phosphates, etc. of alkali-earth elements. The group 2 element compound powder is preferably made up of Mg compound powder, Ba compound powder, and Ca compound powder and/or Sr compound powder. Specifically, it is possible to mention MgO powder and $MgCO_3$ powder as Mg compound powder, BaO powder and $BaCO_3$ powder as Ba compound powder, CaO powder and $CaCO_3$ powder as Ca compound powder, and SrO powder and $SrCO_3$ powder as Sr compound powder, and so on. In the case of using a powder other than oxides as the group 2 element compound powder, its usage is grasped in mass % in terms of oxide. Purity of the group 2 element compound powder is basically the same as Al compound powder. By the same reason as that for Si compound powder, it is preferable that the average particle size D50 of the group 2 element compound powder is 0.5-3.0 µm.

The rare-earth element compound powder is not particularly limited so long as it is a compound that is converted to RE component by sintering. For example, it is possible to mention powders of rare-earth element oxides and its complex oxides, etc. By adjusting the mixing proportion of the rare-earth element compound powder in the raw material powder, it is possible to adjust dielectric constant $\in$ of the aluminum-based sintered body to be obtained. Specifically, there is a tendency that the dielectric constant $\in$ increases by increasing the mixing proportion of the rare-earth element compound powder. In the case of using a powder other than oxides as the rare-earth element compound powder, its usage is grasped in mass % in terms of oxide. Purity and the average particle size of the rare-earth element compound powder are basically the same as those of Al compound powder.

In the raw material powder, each powder is mixed such that the content of the rare-earth compound powder in terms of oxide in the raw material powder becomes 0.5-4.0 mass %. In a spark plug production process according to this invention, the content of each of Al compound powder, Si compound powder, the group 2 element compound powder, the rare-earth compound powder, etc. in terms of oxide is basically the same as the content of each in the alumina-based sintered body.

It is also possible to add, for example, a hydrophilic binder as a binder to the raw material powder. As this hydrophilic binder, it is possible to mention, for example, polyvinyl alcohol, water-soluble acrylic resins, gum arabic, dextrin, etc. Furthermore, as a solvent for dispersing the raw material powder, it is possible to use, for example, water, alcohol, etc. These hydrophilic binder and solvent can be used singly or in a combination of at least two kinds. Regarding the usage of the hydrophilic binder and the solvent, when the raw material powder is 100 parts by mass, the hydrophilic binder is 0.1-5.0 parts by mass, preferably 0.5-3.0 parts by mass, and water used as the solvent is 40-120 parts by mass, preferably 50-100 parts by mass.

The thus obtained slurry can be adjusted, for example, to have an average particle size of 1.4-5 μm. Then, the thus obtained slurry is granulated to have an average particle size of 50-200 μm, preferably 70-150 μm by spray drying by a spray dry method or the like. Each average particle size refers to the value measured by laser diffractometry (Microtrac particle size distribution measurement device (MT-3000) made by NIKKISO CO., LTD.).

This granulated substance is pressed to obtain an unbaked compact preferably having the shape and the size of the insulator 2. This pressing is conducted under a pressure of 50-70 MPa. If the pressure is in the range, it is possible to adjust the areal ratio ($S_A/S$) in the alumina-based sintered body obtained to 2.0-4.0%. Specifically, the areal ratio ($S_A/S$) increases by lowering the pressure, and in contrast the areal ratio ($S_A/S$) decreases by heightening the pressure. The obtained unbaked compact is ground to trim its own shape. This unbaked compact is formed of a granulated substance having a relatively large average particle size. Therefore, it is superior in machinability and can easily be shaped into a desired shape with a high productivity by the above method with an industrially low price.

The unbaked compact thus ground and shaped into a desired shape is baked in an atmosphere of the air at 1500-1700° C., preferably 1550-1650° C., for 1-8 hours, preferably 3-7 hours, to obtain an alumina-based sintered body. If the baking temperature is 1500-1700° C., the sintered body is easily sufficiently densified. This makes it difficult to generate an abnormal grain growth of alumina component. Therefore, it is possible to secure withstand voltage characteristics and mechanical strength of the alumina-based sintered body to be obtained. Furthermore, if the baking time is 1-8 hours, the sintered body is easily sufficiently densified. This makes it difficult to generate an abnormal grain growth of alumina component. Therefore, it is possible to secure withstand voltage characteristics and mechanical strength of the alumina-based sintered body to be obtained.

By thus sintering the unbaked compact having the above composition, there is obtained an alumina-based sintered body containing Al component as a main component, Si component, the group 2 element component of at least two kinds containing Mg component and Ba component, and 0.5-4.0 mass % of a rare-earth element component. This alumina-based sintered body has a dielectric constant ∈ within a range of 9.4-10.5. Furthermore, the alumina-based sintered body obtained is such that, when a plurality of spots, for example, nine spots, each having a region of 250 μm×190 μm on the mirror polished surface have been observed with a magnification power of 500, the areal ratio ($S_A/S$) of the total area $S_A$ of pores existing in the observed region to the area S of the observed region is 2.0 to 4.0%, and the areal ratio ($S_{20}/S$) of the total area $S_{20}$ of pores, which exist in the observed region and of which diameter defined as that of a circle corresponding thereto is 20 μm or greater, to the area S of the observed region is 0.3% or less. Therefore, this alumina-based sintered body shows a high stain resistance and high withstand voltage characteristics for a long term, when it has been formed into an insulator of a small-sized spark plug. Consequently, this alumina-based sintered body is preferable as a material that forms an insulator, with which a small-sized spark plug or a spark plug for a high-power internal combustion engine is equipped, and particularly as a material that forms an insulator with which a small-sized spark plug having both a high stain resistance and high withstand voltage characteristics for a long term is equipped.

According to need, this alumina-based sintered body may be shaped again in its shape or the like to agree with the shape and the size of the insulator 2. In this manner, it is possible to produce an alumina-based sintered body and the insulator 2 for the spark plug 100, which is constituted of this alumina-based sintered body.

Next, the center electrode 3 is installed in the obtained insulator 2 by an insertion into its through hole 6. The insulator 2, in which the center electrode 3 has been installed, is inserted into the main metal member 1, and the first main metal member stepped portion 55 and the first insulator stepped portion 27 are engaged with each other, thereby attaching the insulator 2 to the main metal member 1. The main metal member 1 has been adjusted to the above-mentioned shape and size. The earth electrode 4 is joined to around an end portion of the main metal member 1 by electric resistance welding or the like before or after attaching the insulator 2. Thus, it is possible to produce the spark plug 100 satisfying the above conditions (1) to (3). In the spark plug production process according to this invention, it is possible to mention one embodiment of a spark plug according to this invention, which is shown, for example, in FIG. 1 to FIG. 3, as a mode for assembling the center electrode, the insulator, and the main metal member.

A spark plug according to this invention is used as an ignition plug of automotive internal combustion engines, such as gasoline engines, diesel engines, etc., and is fixed at a predetermined position by subjecting the mounting thread portion 7 to a threaded engagement with a threaded hole provided with a head (not shown in the drawings) that delimits and forms a combustion chamber of an internal combustion engine.

Thus, the insulator 2 is made of an alumina-based sintered body having the above-mentioned composition and the above-mentioned characteristics. Therefore, according to this invention, it is possible to provide a spark plug production process that is capable of producing a spark plug equipped with both stain resistance and withstand voltage characteristics for a long term, even if it is small-sized. Furthermore, according to this invention, it is possible to provide a process for producing a small-sized spark plug that is equipped with both stain resistance and withstand voltage characteristics for a long term, even if it is installed in a high power, internal combustion engine or the like.

A spark plug according to this invention is not limited to the above-mentioned embodiment and can be variously modified to the extent that the object of the present invention can be achieved. For example, in the spark plug 100, the stem portion 30 is generally truncated cone in shape. In this invention, however, the stem portion may be equipped with a cylindrical, stem base portion having a generally uniform outer diameter, and, from this stem base portion through a stepped portion, a stem front end portion that has a diameter smaller than that of the stem base portion and is generally truncated cone in shape.

The spark plug 100 is equipped with the center electrode 3 and the earth electrode 4. In this invention, however, it may be equipped with a noble metal chip at the front end portion of the center electrode and/or on the surface of the earth electrode. The noble metal chip, which is formed at the front end portion of the center electrode and on the surface of the earth electrode, generally has a cylindrical shape, is adjusted to have suitable dimensions, and is welded onto the front end portion of the center electrode or the surface of the earth electrode by a suitable welding method, such as laser welding or electric resistance welding. The spark discharge clearance is formed between the surface of the noble metal chip formed at the front end portion of the center electrode and the surface of the noble metal chip formed on the surface of the earth electrode. As a material forming this noble metal chip, it is possible to mention a noble metal, such as Pt, Pt alloy, Ir, Ir alloy, etc.

EXAMPLES

Examples 1-15 and Comparative Examples 1-5

A slurry was prepared by adding a hydrophilic binder to a raw material powder of alumina powder, Si compound powder, Mg compound powder, Ba compound powder, Ca compound powder and/or Sr compound powder as the group 2 element compound powder, and a rare-earth compound powder (the type of each powder mixed is shown in Table 1). The average particle size D50 of the Si compound powder and the group 2 element compound powder is shown in Table 1 as "the average particle size D (μm) of the sintering aid" 50.

The obtained slurry was granulated into a powder having an average particle size of about 100 μm by spray drying by a spray dry method or the like. This powder was subjected to a rubber pressing by a compacting pressure shown in Table 1 to obtain an unbaked compact. This unbaked compact was baked under an atmosphere of the air by setting the sintering time at 1 to 8 hours within a sintering temperature range of 1500-1700° C., followed by glazing and a finish sintering, thereby obtaining each alumina-based sintered body. The sintering conditions were all set at the same conditions within the above-mentioned ranges.

Each composition, that is, the content of each component of the obtained alumina-based sintered bodies was calculated as mass percentage (%) by a quantitative analysis using an energy dispersive microanalyzer (EPMA/EDS), provided that the total content (in terms of oxide) of Al component, Si component, the group 2 element component, and the rare-earth element component is 100 mass %. As the energy dispersive microanalyzer (EPMAIEDS) analysis condition, the arithmetic mean value when measuring ten points was determined by using a field emission electron probe microanalyzer (JXA-8500F, made by JEOL Ltd.) and setting spot diameter ϕ at 200 and accelerating voltage at 20 kV. The results are shown in Table 1. In Table 1, a blank column means that the component was not detected. The content of each component shown in Table 1 almost agreed with the mixing percentage in the raw material powder. Furthermore, there are shown in Table 2 the results obtained by measuring or calculating the dielectric constant ∈, the areal ratio ($S_4$/S), and the areal ratio ($S_{20}$/S) of each alumina-based sintered body obtained, by the above-mentioned methods.

TABLE 1

| | Plug Type | Compacting Pressure (MPa) | D50 of Sintering Aid (μm) | Composition (mass % in terms of oxide) | | | | | | | | | |
|---|---|---|---|---|---|---|---|---|---|---|---|---|---|
| | | | | $Al_2O_3$ | $SiO_2$ | CaO | MgO | BaO | SrO | $La_2O_3$ | $Nd_2O_3$ | $Pr_6O_{11}$ | $Y_2O_3$ |
| Example 1 | M12 | 48 | 3.8 | 94.50 | 2.80 | 0.40 | 0.10 | 0.70 | | 1.50 | | | |
| Example 2 | M12 | 48 | 3.8 | 94.50 | 2.80 | 0.40 | 0.10 | 0.70 | | 1.50 | | | |
| Example 3 | M12 | 48 | 3.8 | 94.50 | 2.80 | 0.40 | 0.10 | 0.70 | | 1.50 | | | |
| Example 4 | M12 | 75 | 2.0 | 94.50 | 2.80 | 0.40 | 0.10 | 0.70 | | 1.50 | | | |
| Example 5 | M12 | 70 | 2.0 | 94.50 | 2.80 | 0.40 | 0.10 | 0.70 | | 1.50 | | | |
| Example 6 | M12 | 60 | 3.8 | 94.50 | 2.80 | 0.40 | 0.10 | 0.70 | | 1.50 | | | |
| Example 7 | M12 | 50 | 3.0 | 94.50 | 2.80 | 0.40 | 0.10 | 0.70 | | 1.50 | | | |
| Example 8 | M12 | 55 | 3.0 | 93.60 | 2.80 | 0.40 | 0.10 | 0.70 | | 2.40 | | | |
| Example 9 | M12 | 50 | 3.0 | 92.80 | 2.30 | 0.40 | 0.10 | 0.40 | | 4.00 | | | |
| Example 10 | M12 | 52 | 3.0 | 92.50 | 2.10 | 0.30 | 0.10 | 0.30 | | 4.70 | | | |
| Example 11 | M12 | 48 | 3.8 | 94.60 | 3.00 | | 0.20 | 0.70 | | 1.50 | | | |
| Example 12 | M12 | 48 | 3.8 | 94.50 | 2.80 | | 0.10 | 0.70 | 0.40 | 1.50 | | | |
| Example 13 | M12 | 48 | 3.8 | 94.50 | 2.80 | 0.40 | 0.10 | 0.70 | | | 1.50 | | |
| Example 14 | M12 | 48 | 3.8 | 94.50 | 2.80 | 0.40 | 0.10 | 0.70 | | | | 1.50 | |
| Example 15 | M12 | 48 | 3.8 | 94.50 | 2.80 | 0.40 | 0.10 | 0.70 | | | | | 1.50 |
| Com. Ex. 1 | M14 | 48 | 3.8 | 94.50 | 2.80 | 1.50 | 0.50 | 0.70 | | | | | |
| Com. Ex. 2 | M14 | 48 | 3.8 | 94.50 | 2.80 | 1.50 | 0.50 | 0.70 | | | | | |
| Com. Ex. 3 | M12 | 48 | 3.8 | 94.50 | 2.80 | 1.50 | 0.50 | 0.70 | | | | | |
| Com. Ex. 4 | M12 | 48 | 3.8 | 94.50 | 2.80 | 1.50 | 0.50 | 0.70 | | | | | |
| Com. Ex. 5 | M10 | 48 | 3.8 | 94.50 | 2.80 | 1.50 | 0.50 | 0.70 | | | | | |

(Stain resistance) Using each alumina-based sintered body, the spark plug 100 shown in FIG. 1 to FIG. 3 was produced. In the spark plugs of Examples 1-15 and Comparative Examples 1-5, nominal diameter of the mounting thread portion 7 was adjusted to the value conforming to the plug type shown in Table 1, the spark discharge clearance g was adjusted to 1.1 mm, and the inner diameter $D_{IN}$ (mm) of the engaging projection portion 56 and the maximum outer diameter $d_{OUT}$ (mm) and the inner diameter $d_{IN}$ (mm) of the stem base portion were respectively adjusted to the values shown in Table 1. Using each spark plug thus prepared, a pre-delivery durability test was conducted. That is, each spark plug was mounted on a test car (displacement: 1500 cc, in-line four) with a voltage application polarity by setting the earth electrode 4 positive and the center electrode 2 negative. A travelling pattern (test room temperature: −10° C.) exemplified in JIS:D 1606 was defined as one cycle, and this was repeated until insulating resistance of the spark plug lowered to 10 MΩ or less. Stain resistance of the spark plug was evaluated by the number of the cycles. It was judged as "O" in case that the number of the cycles was 10 cycles or greater. It was judged as "x" in case that it was 6 cycles or less. The results are shown in Table 2.

(Withstand voltage characteristics: applied voltage 38 kV) Withstand voltage characteristics upon applying a high voltage in each spark plug were evaluated in a manner that is basically the same as that for the above-mentioned withstand voltage characteristics 1, except in that the voltage continuously applied between the main metal member 1 and the center electrode 3 was set at 38 kV. The results are shown in Table 2 as "withstand voltage characteristics, applied voltage 38 kV". In withstand voltage characteristics by applying a voltage of 38 kV to the main metal member 1 and the center electrode 3, it is practically admissible if the breakdown percentage (%) is less than 20%, and it shows sufficient withstand voltage characteristics in practice for a long term if the breakdown percentage (%) is 0%.

Dielectric constant 6, the areal ratio ($S_A/S$) and the areal ratio ($S_{20}/S$) in the insulator of each spark plug were the same as those of the alumina-based sintered body shown in Table 2.

TABLE 2

|  | $D_{IN}$ (mm) | $d_{OUT}$ (mm) | $d_{IN}$ (mm) | $(D_{IN} - d_{OUT})/2$ (mm) | $(d_{OUT} - d_{IN})/2$ (mm) | ε | $(S_A/S)$ (%) | $(S_{20}/S)$ (%) | Stain Resistance | Withstand Voltage Characteristics | |
|---|---|---|---|---|---|---|---|---|---|---|---|
|  |  |  |  |  |  |  |  |  |  | Applied Voltage 33 kV | Applied Voltage 38 kV |
| Example 1 | 6.2 | 5.6 | 2.3 | 0.40 | 1.65 | 9.4 | 4.7 | 0.5 | O | ◎ | O |
| Example 2 | 6.2 | 5.6 | 2.3 | 0.30 | 1.65 | 9.4 | 4.7 | 0.5 | O | ◎ | O |
| Example 3 | 6.2 | 5.6 | 2.3 | 0.40 | 1.55 | 9.4 | 4.7 | 0.5 | O | ◎ | O |
| Example 4 | 6.2 | 5.6 | 2.3 | 0.30 | 1.65 | 9.4 | 1.5 | 0.2 | O | ◎ | O |
| Example 5 | 6.2 | 5.6 | 2.3 | 0.30 | 1.65 | 9.4 | 2.0 | 0.2 | O | ◎ | ◎ |
| Example 6 | 6.2 | 5.6 | 2.3 | 0.30 | 1.65 | 9.4 | 2.9 | 0.5 | O | ◎ | O |
| Example 7 | 6.2 | 5.6 | 2.3 | 0.30 | 1.65 | 9.4 | 4.0 | 0.3 | O | ◎ | ◎ |
| Example 8 | 6.2 | 5.6 | 2.3 | 0.30 | 1.65 | 10.0 | 3.8 | 0.3 | O | ◎ | ◎ |
| Example 9 | 6.2 | 5.6 | 2.3 | 0.30 | 1.65 | 10.5 | 4.0 | 0.3 | O | ◎ | ◎ |
| Example 10 | 6.2 | 5.6 | 2.3 | 0.30 | 1.65 | 11.0 | 3.9 | 0.3 | O | ◎ | O |
| Example 11 | 6.2 | 5.6 | 2.3 | 0.30 | 1.65 | 9.4 | 4.7 | 0.5 | O | ◎ | O |
| Example 12 | 6.2 | 5.6 | 2.3 | 0.30 | 1.65 | 9.4 | 4.7 | 0.5 | O | ◎ | O |
| Example 13 | 6.2 | 5.6 | 2.3 | 0.30 | 1.65 | 9.4 | 4.7 | 0.5 | O | ◎ | O |
| Example 14 | 6.2 | 5.6 | 2.3 | 0.30 | 1.65 | 9.4 | 4.7 | 0.5 | O | ◎ | O |
| Example 15 | 6.2 | 5.6 | 2.3 | 0.30 | 1.65 | 9.4 | 4.7 | 0.5 | O | ◎ | O |
| Com. Ex. 1 | 7.9 | 6.9 | 2.7 | 0.50 | 2.10 | 9.0 | 4.8 | 0.5 | X | ◎ | ◎ |
| Com. Ex. 2 | 7.9 | 7.4 | 2.7 | 0.25 | 2.35 | 9.0 | 4.8 | 0.5 | O | ◎ | ◎ |
| Com. Ex. 3 | 6.2 | 5.2 | 2.3 | 0.50 | 1.45 | 9.0 | 4.8 | 0.5 | X | ◎ | X |
| Com. Ex. 4 | 6.2 | 5.6 | 2.3 | 0.40 | 1.65 | 9.0 | 4.8 | 0.5 | O | ◎ | X |
| Com. Ex. 5 | 5.2 | 4.8 | 1.7 | 0.20 | 1.55 | 9.0 | 4.8 | 0.5 | O | ◎ | X |

(Withstand voltage characteristics: applied voltage 33 kV) Similar to stain resistance, each spark plug of Examples 1-15 and Comparative Examples 1-5 was prepared by a plural number. A voltage of 33 kV was continuously applied for 200 hours between the main metal member 1 and the center electrode 3 of a spark plug prepared under an environment having a surrounding pressure of 10 MPa. This test was conducted on each spark plug. There was calculated the breakdown percentage (%) of the number of spark plugs with the occurrence of insulation breakdown to the total number of each spark plug tested, to evaluate withstand voltage characteristics of the spark plugs. Withstand voltage characteristics were judged as "◎" in case that the breakdown percentage (%) was 0%, "O" in case that the breakdown percentage (%) was greater than 0% and less than 20%, and "x" in case that the breakdown percentage (%) was 20% or greater. The results are shown in Table 2 as "withstand voltage characteristics, applied voltage 33 kV". In withstand voltage characteristics by applying a voltage of 33 kV to the main metal member 1 and the center electrode 3, it is practically admissible if the breakdown percentage (%) is less than 20%, and it shows sufficient withstand voltage characteristics in practice for a long term if the breakdown percentage (%) is 0%.

As shown in Table 2, even though Examples 1-15 satisfying all of the above-mentioned conditions (1) to (3) were small-sized spark plugs such that nominal diameters of the mounting thread portion 7 were M12, insulation breakdown hardly occurred, and high withstand voltage characteristics were shown, without spoiling stain resistance, not only in the case of continuously applying a voltage of 33 kV for a long term of 200 hours, but also in the case of continuously applying a high voltage of 38 kV for a long term of 200 hours. Similarly, even a small-sized spark plug showed high withstand voltage characteristics without spoiling stain resistance, if the alumina-based sintered body contains $Al_2O_3$ as a main component, $SiO_2$, oxides, of group 2 element of the periodic table based on IUPAC Recommendation 1990, of at least two kinds, containing MgO and BaO, 0.5-4.0 mass % of a rare-earth element oxide, provided that the total of these contents becomes 100 mass %.

Furthermore, superior withstand voltage characteristics were shown for a long term by each of Examples in which dielectric constant ∈ was 9.4-10.5, the areal ratio ($S_A/S$) was 2.0-4.0%, and the areal ratio ($S_{20}/S$) was 0.3% or lower, and Examples in which alumina-based sintered bodies were produced so that the average particle size D50 of the raw material powder was 0.5-3.0 μm and the compacting pressure was 50-70 MPa. In particular, in each of Examples 5 and 7-9 satisfying all of these, no insulation breakdown occurred at all and extremely superior withstand voltage characteristics were shown for a long term, even if a voltage of 33 kV and a high voltage of 38 kV are continuously applied for a long term of 200 hours.

On the other hand, since Comparative Examples 1 and 2 do not satisfy the condition (2) and have very thick, stem base portions of 2.1 mm or greater, a sufficient downsizing is not possible, although they are superior in withstand voltage characteristics. Comparative Examples 3-5 satisfy the condition (2), but do not satisfy the condition (3). Therefore, insulation breakdown tended to occur, and withstand voltage characteristics when applying a high voltage of 38 kV did not reach a practical admissible range. Comparative Examples 1 and 3 did not satisfy the condition (1) and were inferior in stain resistance since the base portion clearance S was wide.

A spark plug according to this invention can be used for any internal combustion engines. It is suitable as a small-sized spark plug that requires a thinned insulator, for example, as a spark plug used for high-power internal combustion engines, etc. In particular, it is suitable as a spark plug used for internal combustion engines requiring a small-sized spark plug equipped with both stain resistance and withstand voltage characteristics for a long term.

DESCRIPTION OF REFERENCE NUMERALS

100: spark plug, 1: main metal member, 2: insulator, 3: center electrode, 4: earth electrode, 6: through hole, 7: mounting thread portion, 29: stem base portion, 30: stem portion (insulator, reduced diameter portion), 56: engaging projection portion (main metal member base portion), g: spark discharge clearance, and S: base portion clearance.

Having described the invention, the following is claimed:

1. A spark plug that is equipped with (a) an insulator that is generally cylindrically formed to have a small-diameter stem portion on a front end side and has a through hole passing though in an axial direction, (b) a center electrode inserted on the front end side of the through hole, and (c) a main metal member that is generally cylindrically formed to have an engaging projection portion projecting inwardly in the diametral direction and retains the insulator inserted thereinto, at the engaging projection portion, the spark plug being characterized by that, when an inner diameter of the engaging projection portion is represented by $D_{IN}$ (mm), the maximum outer diameter of a portion, which faces an inner circumferential surface of the engaging projection portion, of the stem portion is represented by $d_{OUT}$ (mm), and its inner diameter is represented by $d_{IN}$ (mm), and dielectric constant of the insulator is represented by $\in$, condition (1) of "$(D_{IN}-d_{OUT})/2 \leq 0.40$ (mm)", condition (2) of "$(d_{OUT}-d_{IN})/2 \leq 1.65$ (mm)", and condition (3) of "$\in \geq 9.4$" are satisfied.

2. The spark plug according to claim 1, which is characterized by that the dielectric constant $\in$ is 10.5 or less, and the insulator is such that, when a region of 250 μm×190 μm on a mirror polished surface thereof has been observed with a magnification power of 500, an areal ratio $(S_A/S)$ of a total area $S_A$ of pores existing in the observed region to an area S of the observed region is 2.0 to 4.0%, and an areal ratio $(S_{20}/S)$ of a total area $S_{20}$ of pores, which exist in the observed region and of which diameter defined as that of a circle corresponding thereto is 20 μm or greater, to the area S of the observed region is 0.3% or less.

3. The spark plug according to claim 1, which is characterized by that the insulator is formed of an alumina-based sintered body containing $Al_2O_3$ as a main component, $SiO_2$, oxides, of the group 2 elements in the periodic table based on IUPAC Recommendation 1990, of at least two kinds, including MgO and BaO, and 0.5 to 4.0 mass % of a rare-earth element oxide such that a total of these contents becomes 100 mass %.

4. A process for producing the spark plug according to claim 1, the spark plug production process being characterized by comprising a step of producing the insulator by pressing and then sintering a raw material powder containing Al compound powder as a main component, Si compound powder, a powder, of a compound of an element of group 2 in the periodic table based on IUPAC Recommendation 1990, of at least two kinds containing Mg compound powder and Ba compound powder, and 0.5-4.0 mass % of a rare-earth compound powder, such that sum of contents of these in terms of oxide becomes 100 mass %.

5. The spark plug production process according to claim 4, which is characterized by that the Si compound powder and the group 2 element compound powder have an average particle size D50 of 0.5-3.0 μm, and that the pressing is conducted under a pressure of 50-70 MPa.

* * * * *